United States Patent
Durand et al.

(10) Patent No.: US 12,179,347 B2
(45) Date of Patent: Dec. 31, 2024

(54) DEVICE WITH COMPONENTS CONNECTED VIA A CONNECTION INTERFACE AND METHOD FOR CONNECTING COMPONENTS

(71) Applicant: AFAG HOLDING AG, Zell (CH)

(72) Inventors: Friedrich Durand, Rüttenen (CH); Tobias Frasch, Tannheim (DE); Timo Zimmermann, Wendlingen (DE); Johannes Hoos, Esslingen (DE); Markus Trick, Stuttgart (DE)

(73) Assignee: AFAG HOLDING AG, Zell (CH)

( * ) Notice: Subject to any disclaimer, the term of this patent is extended or adjusted under 35 U.S.C. 154(b) by 355 days.

(21) Appl. No.: 17/685,696

(22) Filed: Mar. 3, 2022

(65) Prior Publication Data

US 2022/0281125 A1    Sep. 8, 2022

(30) Foreign Application Priority Data

Mar. 4, 2021    (DE) .................... 10 2021 105 255.6

(51) Int. Cl.
*B25J 19/00*    (2006.01)
*B25J 15/04*    (2006.01)
(Continued)

(52) U.S. Cl.
CPC ....... *B25J 19/0029* (2013.01); *B25J 15/0408* (2013.01); *F16L 37/101* (2013.01);
(Continued)

(58) Field of Classification Search
CPC .................. B25J 19/0029; B25J 15/0408; B25J 19/0033; B25J 15/04; F16L 37/101;
(Continued)

(56) References Cited

U.S. PATENT DOCUMENTS 4,809,215 A * 2/1989 Nakamura ............... G09G 5/22
                                                    713/600
4,867,467 A * 9/1989 Huidekoper ........... B62K 25/24
                                                    280/279
(Continued)

FOREIGN PATENT DOCUMENTS

DE    2359195 A1    6/1975
FR    2854675 A1    11/2004
(Continued)

OTHER PUBLICATIONS

European Patent Office issued an European Search Report on Aug. 18, 2022 regarding parallel European Patent Application No. 22159719.8, 6 Pages.
(Continued)

*Primary Examiner* — Alexander Gilman
(74) *Attorney, Agent, or Firm* — LUCAS & MERCANTI, LLP; Klaus P. Stoffel

(57) ABSTRACT

Device for handling and/or processing parts, having first and second subassemblies separably connectable by a connection interface that results from a first contact section of the first subassembly being plugged and/or pressed in a connecting direction onto a second contact section of the second subassembly in a first orientation specified relative to the second contact section. The connection interface includes an electrical interface for transmitting electrical power and/or communication signals between the subassemblies and a fluid interface for transporting fluid between the subassemblies. The first and second contact sections are configured so the connection interface also results if the first contact section is plugged or pressed in the connecting direction onto the second contact section in a further orientation. The further orientation corresponds to the first orientation aside from a rotation of the first contact section by a specified
(Continued)

angle about a rotation axis running in the connecting direction.

15 Claims, 4 Drawing Sheets

(51) Int. Cl.
*F16L 37/10* (2006.01)
*H01R 13/00* (2006.01)
*H01R 13/629* (2006.01)
*H01R 43/26* (2006.01)

(52) U.S. Cl.
CPC ......... *H01R 13/005* (2013.01); *H01R 13/629* (2013.01); *H01R 43/26* (2013.01)

(58) Field of Classification Search
CPC ... F16L 37/565; H01R 13/005; H01R 13/629; H01R 43/26; B23Q 1/0009
See application file for complete search history.

(56) References Cited

U.S. PATENT DOCUMENTS

| | | | | |
|---|---|---|---|---|
| 4,906,628 | A * | 3/1990 | Coates | C07D 401/10 544/405 |
| 8,601,667 | B2 * | 12/2013 | Norton | B23B 31/1071 279/81 |
| 10,500,735 | B1 * | 12/2019 | Menon | B25J 15/0061 |
| 11,099,560 | B2 * | 8/2021 | Smith | B62D 13/06 |
| 11,413,761 | B2 * | 8/2022 | Simkins | B25J 9/161 |
| 11,433,412 | B2 * | 9/2022 | Viggiani | B25J 15/0019 |
| 2015/0088300 | A1 * | 3/2015 | Kilibarda | B25J 15/0019 901/41 |
| 2015/0326655 | A1 * | 11/2015 | Quan | H04L 67/1097 709/201 |
| 2015/0328655 | A1 * | 11/2015 | Reichler | F16L 37/248 285/120.1 |
| 2017/0095937 | A1 * | 4/2017 | Williams | B25J 15/0408 |
| 2018/0333867 | A1 * | 11/2018 | Lee | B25J 19/0033 |
| 2018/0338673 | A1 * | 11/2018 | Krimsky | A61B 34/20 |
| 2019/0224858 | A1 * | 7/2019 | Hansen | B25J 15/0408 |
| 2020/0061848 | A1 * | 2/2020 | Bolton | B25J 15/0019 |
| 2020/0269417 | A1 * | 8/2020 | Riek | B25J 19/0025 |
| 2020/0315738 | A1 * | 10/2020 | Dewaele | B25J 15/04 |
| 2021/0031361 | A1 * | 2/2021 | Morey | B25J 19/0029 |
| 2021/0387357 | A1 * | 12/2021 | Kendrick | B25J 15/0408 |
| 2022/0088798 | A1 * | 3/2022 | Norton | B25J 15/0019 |

FOREIGN PATENT DOCUMENTS

| | | |
|---|---|---|
| WO | 9111338 A1 | 8/1991 |
| WO | 2011061532 A1 | 5/2011 |

OTHER PUBLICATIONS

Chinese Patent Office issued an Office Action on May 17, 2024 regarding parallel Chinese Patent Application No. 202210209636.1, 12 Pages.

* cited by examiner

;# DEVICE WITH COMPONENTS CONNECTED VIA A CONNECTION INTERFACE AND METHOD FOR CONNECTING COMPONENTS

CROSS-REFERENCE TO RELATED APPLICATIONS

The present application claims priority of DE 10 2021 105 255.6, filed Mar. 4, 2021, the priority of this application is hereby claimed, and this application is incorporated herein by reference.

BACKGROUND OF THE INVENTION

The invention relates to a device, in particular for the handling and/or processing of parts, having a first and a second subassembly which are separably connected or connectable by means of a connection interface, wherein the connection interface results from a first contact section of the first subassembly being plugged and/or pressed in a connecting direction onto a second contact section of the second subassembly in a first orientation that is specified relative to the second contact section, wherein the connection interface comprises firstly an electrical interface for the transmission of electrical power and/or of communication signals between the first and the second subassembly and secondly a fluid interface for the transport of fluid between the first and the second subassembly. The invention furthermore relates to a method for connecting a first subassembly to a second subassembly in a device.

Devices for handling and/or processing parts, for example in the robotics sector, handling systems sector or generally the automation sector, are commonly constructed in modular fashion from several components, wherein, in particular, actuator-driven components, such as carriages, pivoting components, gripping components, manipulators etc., are attached as separate components to a main body, support arms or the like. After the assembly of corresponding components, electrical connections and fluidic connections can be connected using corresponding connection cables and hoses. As a result, the assembly of corresponding devices, or an exchange of corresponding components, can be relatively cumbersome.

In order to allow a faster exchange of tools, it is known from the robotics sector to use quick-action connectors which allow a mechanical fastening of a tool to a robot arm and which have leadthroughs for electrical contacts and compressed air, such that, when the mechanical connection is produced, the electrical and fluidic connections are also made. Thus, a fixed position and orientation for the tool are specified, and the electrical and fluidic contacting are performed, by means of such a quick-action connector.

Devices for the handling or processing of parts are, in particular in industrial applications, typically configured for the specific requirements of the application, that is to say for example adapted to an available structural space and to other devices involved in the process. Corresponding devices are thus commonly unique items, or are produced in relatively small unit quantities. In order to make this possible with reasonable outlay, during the construction of such a device, at least substantially prefabricated modules are used, and the desired construction is attained through suitable arrangement and orientation of these modules with respect to one another. Here, the use of the above-described quick-action connecting system could duly reduce assembly and maintenance times, but the flexibility with regard to the arrangement of the various modules with respect to one another would be considerably restricted here. If it is therefore sought to use such a connection approach without excessive restrictions in flexibility with regard to the construction of the device, it is necessary for the modular system to include numerous variants of substantially functionally identical modules for different positions or orientations, or under some circumstances it is necessary to construct a relatively large number of application-specific modules. This yields various disadvantages, in particular higher costs and longer delivery times or planning times for the construction of new devices.

SUMMARY OF THE INVENTION

The invention is therefore based on the object of making it possible to use single modules or subassemblies flexibly in different devices and nevertheless achieving simple assembly or a simple exchange of said modules or subassemblies.

The object is achieved according to the invention by means of a device of the type mentioned in the introduction, wherein the first and the second contact section are configured such that the connection interface also results if the first contact section is plugged or fitted in the connecting direction onto the second contact section in at least one further orientation, wherein the respective further orientation corresponds to the first orientation aside from a rotation of the first contact section by a respective specified angle about a rotation axis running in the connecting direction.

In other words, in the device according to the invention, it can be achieved that, when the first subassembly is plugged or pressed onto the second subassembly in several discrete orientations, both fluid transport via the fluid interface and a transmission of power and/or communication signals via the electrical interface can be made possible in each case. Details regarding the implementation of such a connection interface will be discussed in more detail below. In general, the first contact section may be formed by the first subassembly or attached, in particular rigidly, thereto. Correspondingly, the second contact section may be formed by the second subassembly or attached, in particular rigidly, thereto. Selection of the different orientations of the contact sections with respect to one another thus also results in particular in different orientations of the subassemblies with respect to one another, whereby, through selection of a different orientation, the components of the first subassembly can be pivoted or rotated relative to the second subassembly and the specified angle.

Here, the rotation axis is typically exclusively a geometrical axis, that is to say it is not defined by a mechanical shaft or a rotatable bearing arrangement of the subassemblies on one another. As will be discussed in more detail below, said rotation axis is specified by the geometry of those components which implement the connection interface, in particular by a rotational symmetry of said components with respect to the rotation axis.

Owing to the possibility of selecting different possible orientations of the first contact section with respect to the second contact section and thus in particular of the first subassembly with respect to the second subassembly, it is achieved that given subassemblies can be adapted to the requirements of the device or of the user of the device through suitable selection of the orientation of said subassemblies with respect to one another. For example, is possible in this way to use the same subassemblies to implement different movement directions of a component of the first subassembly with respect to the second subassembly; working surfaces, grippers and the like can be oriented or positioned differently, etc.

Plugging of the first subassembly onto the second subassembly can be implemented in particular through the use of a plug-socket connection for the electrical interface, that is to say for example by virtue of a respective plug of the first contact section being inserted into a respective socket of the second contact section, or vice versa, during the plugging-on operation. It is however also possible for a mixture of sockets and plugs to be provided on the first contact section, which interact with a corresponding mating mixture of plugs and sockets of the second contact section.

Sealing of the fluid interface or of individual fluid channels of the fluid interface may be implemented in particular by virtue of one of the contact sections being pressed against a sealing element supported by the other contact section, or by virtue of two sealing elements that are supported by the respective contact section being pressed against one another.

The specified angle(s) or differences between several specified angles may for example be between 10° and 180°. In particular, all specified angles may be an integer multiple of a first specified angle that is defined in particular by an angle of 360° being divided by an integer number of the possible orientations. The orientations may thus be uniformly distributed, for example through the use of n-fold rotational symmetry for the components that form the connection interface, wherein n is the number of possible orientations.

In particular, the connection interface may also be configured for two further orientations or three further orientations or more than three further orientations, which can be achieved in particular by way of n-fold rotational symmetry of the components that form the connection interface, where n=3, n=4 or n>4. This makes it possible for the orientation of the first and second contact sections, and thus in particular of the subassemblies, with respect to one another to be selected as required for example in 120° steps, 90° steps or smaller steps.

The first and the second contact section may be held on one another, or pressed against one another, by a fastening means which is attached to one of the subassemblies or the contact sections or which is configured separately from the contact sections or subassemblies. This will be discussed in more detail below.

The fluid may for example be air, in particular for a pneumatic connection or compressed-air connection, though may also be some other gas or a liquid. The device according to the invention may be used for example in the robotics sector, the handling systems sector or generally in the automation sector. Specifically, one of the subassemblies, in particular the first subassembly, may implement an in particular pneumatically moved carriage, a pivoting component, a gripping component and/or a manipulator.

The electrical interface may be formed on the first and second contact section in each case by a group of multiple electrical connections, wherein multiple instances are provided for each of the connections of the group on the first and/or second contact section, wherein the instances of a respective connection are conductively connected to one another and are arranged spaced apart from one another on a respective circular path about the rotation axis when the contact sections are in the connected state. It can be achieved in this way that, for several orientations of the contact sections with respect to one another, for each of the electrical connections of the first contact section, a respective instance of said connection contacts a respective instance of the associated connection on the second contact section, and thus the same electrical interface is formed for each of the various orientations.

Alternatively, this result could for example also be achieved if the electrical connections of the respective contact section extended annularly over the entire circumference, or at least over a certain angle segment, of the respective contact section. This would however necessitate the use of electrical connections that extend over a large area, as a result of which the provision of the electrical connections is more cumbersome and under some circumstances also results in more structural space being taken up.

It is preferably possible for a second instance of all connections to be offset by a specified angle relative to the respective first instance along the respective circular path. A further instance may in turn be offset by the specified angle relative to said instance, etc. In particular, the various instances of the respective electrical connection may be spaced apart uniformly from one another in a circumferential direction about the rotation axis. In particular, the total number of instances of all electrical connections of the respective contact section may have n-fold rotational symmetry.

The connections may be configured as individual pins, spring contacts or the like. The group of electrical connections is however preferably at least partially combined in a common plug or a common socket. The corresponding plug or the corresponding socket could then be present multiple times in a manner spaced apart from one another in a circumferential direction of the rotation axis in order to provide the various instances of the electrical connections. This can also be regarded as a provision of multiple instances of the group of electrical connections, wherein the respective instance of the groups may be configured in particular as a plug or socket.

The fluid interface may comprise at least one fluid channel that is formed by a fluid-tight connection of a respective first partial channel of the first contact section and a respective second partial channel of the second contact section, wherein, at least in the region of the fluid-tight connection, the fluid channel or at least one of the fluid channels annularly surrounds the rotation axis as viewed in a cross section perpendicular to the connecting direction, and/or wherein the rotation axis runs within the fluid channel or one of the fluid channels. The described configuration makes it possible for the partial channels to be connected to one another in fluid-tight fashion irrespective of a relative orientation of the first and second contact sections in terms of a rotation about the rotation axis. The corresponding configuration may be achieved in the simplest case by virtue of an O-ring for sealing purposes being arranged on the first or second contact section, which O-ring engages over the openings of the partial channels of the contact sections when the first contact section is plugged or pressed onto the second contact section. It is however preferable for the entire fluid channel, or at least one longitudinal section of the fluid channel which comprises the fluid-tight connection, to be annular or circular.

As an alternative to the described configuration of the fluid channel or of the fluid channels, it is possible for several instances to be provided for each fluid channel, which instances are arranged so as to be distributed along a circular path in a circumferential direction of the rotation axis, as has been discussed above with regard to the various instances of the electrical connections. This however generally requires a large amount of structural space, and requires more complex sealing. The configuration discussed above is thus preferably used.

The fluid interface may comprise several, in particular two, of the fluid channels, wherein, at least in the region of the fluid-tight connection, the fluid channels surround the rotation axis as coaxial rings as viewed perpendicular to the connecting direction. The two fluid channels may serve in particular as a fluid feed and a fluid return for the same fluid. Whereas, for example if compressed air is provided via the fluid interface, it may suffice to only conduct compressed air from the second to the first component or vice versa, for example in order to drive an actuator, because the compressed air can escape into the surroundings, it is typically necessary for other fluids, or can also be advantageous for compressed air, to provide a corresponding fluid return.

The first and second contact sections may be connected to one another by a fastening means comprising a main body, which annularly encircles the rotation axis, and comprising in each case multiple first and/or second webs which project from the main body, wherein the first webs engage over in each case one support section of the first contact section and engage on a support surface of said support section, which support surface is averted from the second contact section, and the second webs engage over in each case one support section of the second contact section and engage on a support surface of said support section, which support surface is averted from the first contact section, in order to limit a movement of the contact sections apart in a connecting direction. Through the use of first and second webs, a form of double claw can be formed which engages over support sections of both contact sections and can thus press or hold the contact sections against one another.

The fastening means may be attached to one of the contact sections, for example rotatably mounted there, or provided as separate components. Owing to the ring shape of the main body, it is possible in particular for a relative movement of the contact sections perpendicular to the connecting direction to be blocked or limited, whereby, through suitable attachment of the fastening means, a separation of the contact sections can be prevented. The first webs and the second webs may in each case be spaced apart from one another in a circumferential direction of the rotation axis, wherein preferably in each case one first and one second web are arranged at the same position in the circumferential direction, which can allow force to be conducted particularly effectively via the webs into the respective support sections.

The configuration of the support sections and of the fastening means may be coordinated with one another in particular in such a way that, in a first rotation position with respect to the rotation axis, which can be referred to as fastening position, the fastening means is situated in the described setting and thus holds the contact sections against one another. By virtue of the fastening means being rotated about the rotation axis into a release position, the webs can be moved away from the support sections in a circumferential direction, in particular if the support sections are spaced apart from one another in a circumferential direction, whereby it is made possible for the contact sections to be separated from one another, for example by pulling the first contact section counter to the connecting direction. Conversely, for the connection of the contact sections, the fastening means may initially be arranged in the release position and, after the contact sections have been brought together, moved into the fastening position in order to lock the contact sections together.

The respective support sections of the first and/or of the second contact section may be spaced apart from one another in a circumferential direction of the rotation axis, and/or the support surfaces of the support sections of the first and/or of the second contact section and/or those web surfaces of the first and/or second webs which make contact with the support surfaces may be beveled in a circumferential direction.

The fastening means may be configured such that a pressing force with which the contact sections are pressed against one another is variable by a way of a rotation of the annular main body about the rotation axis, and/or that, by way of said rotation, it is possible to set whether, and/or after how great a displacement travel counter to the connecting direction, a further movement of the contact sections apart is blocked by an abutment of the or a web surface of at least one of the webs against at least one of the support surfaces. In particular, the spacing of the support sections in a circumferential direction may be greater than the width of the web surfaces, such that, during a movement of the contact sections apart when the fastening means is in a corresponding rotational setting, for example in the release position discussed above, the respective web surface can be led through between adjacent support sections, whereby a blocking of the movement of the contact sections apart is eliminated in at least one rotational setting of the fastening means.

A variation of the pressing force can be achieved in particular by way of the abovementioned beveling of the support surfaces or of the web surfaces in a circumferential direction. Owing to the beveling, the corresponding support or web surface runs at an angle with respect to a surface that is perpendicular to the rotation axis. In particular, support surfaces and web surfaces that make contact with one another may run along parallel helical lines, such that the contact pressure or a play in the movements of the contact sections in the connecting direction can be varied by way of a rotation of the fastening means about the rotation axis.

Between the contact sections, there may be arranged an elastically deformed restoring element that subjects the first contact section to a restoring force in a direction away from the second contact section. The restoring element may be formed in particular by a sealing means which serves for sealing off the fluid interface, for example by an O-ring. By means of the restoring force, an inadvertent detachment of the fastening means as a result of a rotation into the release position can be prevented, because a respective pair composed of web surface and support surface are pressed against one another by the restoring force, and therefore a rotation of the fastening means into the release position is prevented, or at least inhibited, by frictional engagement. For the separation of the contact sections, it is for example possible to apply a force sufficient to overcome this frictional force. It is however particularly preferably possible for the contact sections to be pressed against one another in order to further deform the restoring element and thus eliminate or at least significantly reduce the frictional engagement between web surface and support surface.

In addition or as an alternative to the described frictional engagement, the fastening means may engage with detent action in the fastening position, for example by virtue of a detent element, for example a detent lug, being provided on at least one of the webs or on at least one of the support sections. In this case, a movement into the release position may for example be possible only after the detent connection has been released.

The holding of the contact sections against one another, and the fixing of the relative position and orientation thereof, may be realized exclusively by the fastening means, and thus for example exclusively by frictional engagement. In order to however firstly achieve the most exact possible orientation and positioning of the contact sections with respect to one another during the course of the connection thereof, and/or secondly support the contact sections against one another, additional support or guidance may be desired. This may for example accommodate torques about the rotation axis and/or forces perpendicular to the rotation axis without this support or guidance, for example in the case of the contact sections being held against one another purely in frictionally engaging fashion, being able to lead to a change in the relative position of the contact sections and/or to a mechanical load being exerted on the electrical interface, in particular on plugs and/or sockets, and/or on the fluid interface.

It may therefore be advantageous if the first and/or the second contact section have multiple recesses into each of which, at least in the and/or the further orientation, a respective, in particular pin-like projection, which extends parallel to the rotation axis, of the respective other contact section engages. The recesses and in particular the projections may be spaced apart from one another in a circumferential direction about the rotation axis so as to result in the same rotational symmetry as for the components that form the interface. In other words, in every orientation in which the contact sections are connectable to one another, the respective projection can be received in one of the recesses.

Using just a single projection, forces perpendicular to the rotation axis can be accommodated. It is however preferable for at least two projections to be used in order to firstly be able to accommodate torques about the rotation axis and in order to secondly achieve robust centering of the contact sections with respect to the rotation axis. For the purposes stated, it is furthermore advantageous if the projections or recesses are spaced apart from one another to a relatively great extent, that is to say if, for example, two projections are situated opposite one another in relation to the rotation axis and are arranged with a sufficiently large spacing to the rotation axis.

At least one of the subassemblies may comprise an actuator that is configured to move a component that is mounted so as to be movable with respect to the contact section of said subassembly, wherein a direction of the movement and/or of a rotation or pivot axis of the movement and/or a movement path of the component is dependent on whether the first contact section has been plugged and/or pressed in the or the further orientation onto the second contact section. In particular, the movably mounted component may be mounted on a fixed component, or the fixed component may bear the actuator, and the fixed component may be rigidly connected to the contact section of said subassembly.

Other than in the case of a linear movement of the movably mounted component along the rotation axis, one of the stated effects always results from a change in the orientation. If the moved component is for example a carriage that is displaced by the actuator linearly at an angle with respect to the connecting direction, a movement direction can be selected through suitable selection of the orientation. Even in cases in which the movement path runs parallel to the rotation axis, the movement path can be adapted, because, for example, a movement above, below or to the side of the rotation axis can be selected through selection of a suitable orientation with respect to the rotation axis. Different movement paths also result for example if a rotation or pivot axis is, in the various orientations, shifted in each case in parallel with respect to the rotation axis, wherein the direction of the shift is self-evidently dependent on the orientation. By contrast, if the rotation or pivot axis is at an angle with respect to the rotation axis, a change in orientation leads to a change in the direction of the rotation or pivot axis. Altogether, therefore, as a result of different orientations of the contact sections with respect to one another being made possible, high flexibility is achieved with regard to the possible movement paths of the movably mounted component, such that the same first and/or second component can be used flexibly in differently configured devices and can be adapted to the respective requirements through suitable selection of the orientation.

The subassembly that comprises the actuator may in particular be the first subassembly, which for example forms a tool or some other actuator arrangement that is attached to a second subassembly, which may for example be a main body of the device or may serve for the connection of the first subassembly to such a main body.

The actuator may be a pneumatic or hydraulic actuator or at least one of the subassemblies can comprise a pneumatic or hydraulic actuator, wherein the device can be configured such that operating fluid used for the operation of the pneumatic or hydraulic actuator is conducted to said subassembly and/or discharged from said subassembly via the fluid connection.

Alternatively, the actuator may be an electric drive, or at least one of the subassemblies may comprise an electric drive as an actuator. In this case, the actuator may be driven by electrical energy or power that is fed via the electrical interface to the subassembly that comprises the actuator.

At least one of the subassemblies may comprise the or an actuator, wherein the device is configured such that control signals for the control of the actuator in the form of communication signals and/or power for the operation of the actuator, in particular for the operation of an electric drive used as an actuator, can be transmitted via the electrical interface to said subassembly. In the simplest case, the actuator may be controlled directly by way of control signals that are output from the other subassembly via the electrical interface. The subassembly that comprises the actuator however preferably comprises a control unit to which electrical power is supplied in particular via the electrical interface, which control unit receives the communication signals or control signals for the control of the actuator and controls the operation of the actuator correspondingly. In this way, the specific characteristics of the actuator itself do not need to be known for the generation of the communication or control signals, and it is for example possible for abstract commands to be transmitted as communication signals.

The control signals may also be control signals for a pneumatic or hydraulic actuator. In this way, it is for example possible for valves, throttles etc. to be controlled by the control unit in a manner dependent on the control signals. For example, it is possible for a working fluid with a substantially constant pressure to be provided via the fluid connection, following which the specific pressurization of the actuator is performed in a manner dependent on control signals that are transmitted via the electrical interface. The control signals may however alternatively be control signals for an electric drive that is used as an actuator.

In addition or alternatively, the electrical interface may also serve for transmitting sensor data or general operating information between the components.

In a preferred embodiment of the device, a bus or network is led via the electrical interface. In particular, a relatively broad-band data connection may be implemented, for example with a data rate of at least 1 MBit/s. For example, an ethernet connection may be led by the electrical interface, wherein, with ethernet connections known per se, it is for example also possible to achieve data rates of for example 100 MBit/s, or gigabit ethernet may also be used.

If a bus or a network is led via the electrical interface, it is possible for control units, actuators, sensors etc. to be assigned addresses in the bus or the network, for example MAC addresses, IP addresses or the like. Using network or bus functions that are known per se, it is for example possible to implement a dynamic address assignment, and/or discovery functions can be provided by means of which a central control unit of the device can identify a subassembly that is connected via the respective connection interface, or can identify components, for example an actuator and/or a control unit, that are provided in said subassembly.

Aside from the device according to the invention, the invention relates to a method for connecting a first subassembly to a second subassembly in a device, in particular in a device for the handling and/or processing of parts, wherein the first and second subassembly are connected by means of a connection interface by virtue of a first contact section of the first subassembly being plugged and/or pressed in a connecting direction onto a second contact section of the second subassembly in an orientation that is specified relative to the second contact section, wherein the connection interface comprises firstly an electrical interface for the transmission of electrical power and/or of communication signals between the first and the second subassembly and secondly a fluid interface for the transport of fluid between the first and the second subassembly, wherein a first and a second contact section are used which are configured such that, for multiple possible orientations of the first contact section with respect to the second contact section, which orientations differ from one another exclusively in terms of a rotation of the first contact section by a specified angle about a rotation axis running in the connecting direction, the connection interface results when the first contact section is plugged or fitted in the connecting direction onto the second contact section in the respective possible orientation, wherein one of the possible orientations is used as the specified orientation.

In particular, the device according to the invention may be used as the device. Independently of this, features discussed with regard to the device according to the invention, with the advantages mentioned there, may be transferred to the method according to the invention or to a device used in the method according to the invention, and vice versa.

The contact sections may be fastened to one another by a fastening means comprising a main body, which annularly encircles the rotation axis, and comprising in each case multiple first and/or second webs which project from the main body, wherein the fastening is performed by way of a rotation of the fastening means from a release position into a fastening position, wherein, in the fastening position, the first webs engage over in each case one support section of the first contact section and a respective web surface of the respective first web engages on a support surface of said support section, which support surface is averted from the second contact section, and the second webs engage over in each case one support section of the second contact section and a respective web surface of the respective second web engages on a support surface of said support section, which support surface is averted from the first contact section, wherein the respective support sections of the first and/or of the second contact section are spaced apart from one another in a circumferential direction of the rotation axis by intermediate spaces, wherein, in the release position, the web surfaces of the first and/or of the second webs are arranged in the intermediate spaces as viewed perpendicular to the rotation axis. Further details regarding possible configurations of such a fastening means and of the use thereof have already been discussed above with reference to the device according to the invention.

As the first contact section is plugged or pressed in the connecting direction onto the second contact section, the respective web surface may be guided through a respective one of the intermediate spaces. As already discussed with regard to the device according to the invention, the fastening means may initially be arranged in a release position, and the contact sections may then be brought together in the connecting direction, and the fastening means may subsequently be rotated in order to fix the contact sections in the position in which they are pressed or plugged onto one another.

Further advantages and particulars of the present invention arise out of the exemplary embodiment described in the following and also from the associated drawings.

DETAILED DESCRIPTION OF THE INVENTION

Figure 1:
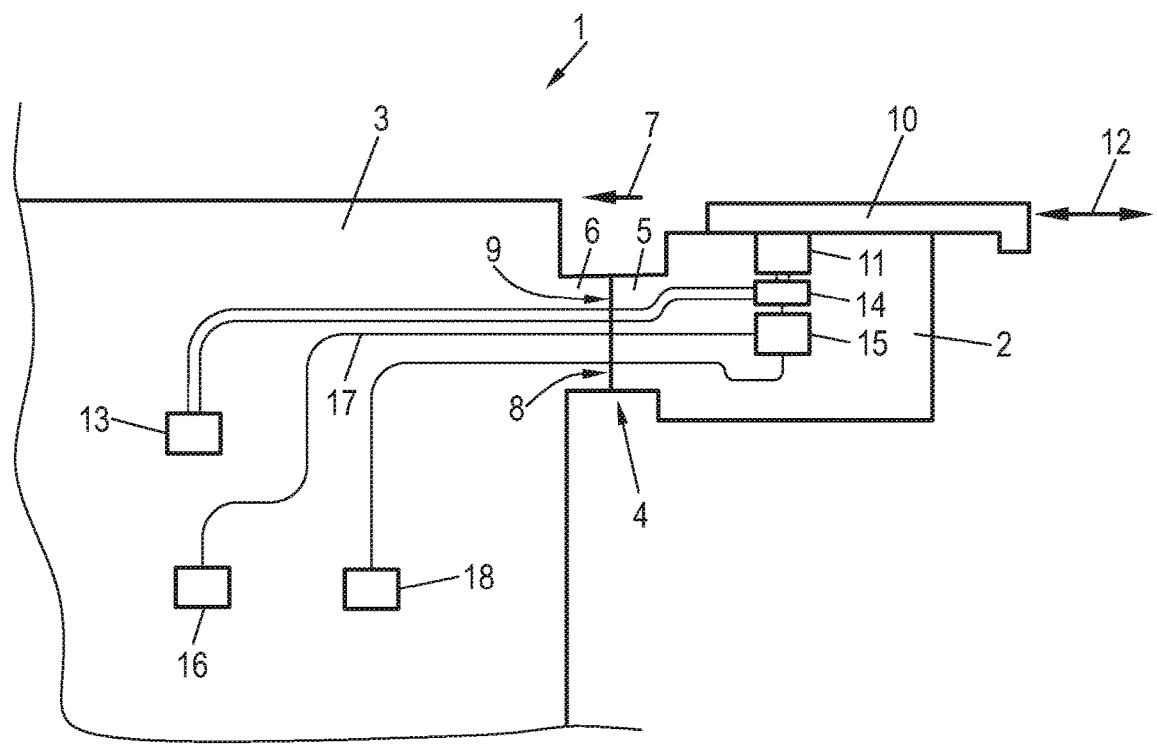
FIG. 1 an exemplary embodiment of a device according to the invention with a first and a second subassembly, which have been connected in accordance with an exemplary embodiment of the method according to the invention, FIG. 2 a detail view of the contact sections of the subassemblies shown in FIG. 1, which implement a connection interface, FIGS. 3 and 4 plan views of the contact sections shown in FIGS. 1 and 2, and FIG. 5 a perspective view of the fastening means illustrated in FIG. 2 and used for holding the contact sections against one another.

FIG. 1 shows a detail view of a device 1, in which two subassemblies 2, 3 of said device are shown. The device 1 may be used in particular for the handling or the processing of parts in a production process. In the example shown, the subassembly 2 is a module that implements a carriage that is moved by actuator means. The subassembly 3 is formed by a main body to which other subassemblies in addition to the subassembly 2 may also be attached. In a modification that is not shown, it would also be possible for multiple different subassemblies of the device 1 to be connected in series, such that, for example, the subassembly 3 could be supported in turn by a further subassembly.

The construction of the device 1 from multiple separably connected subassemblies 2, 3 makes it possible for the device 1 to be constructed in modular fashion, whereby the device 1 can be adapted in accordance with requirements to different applications with a relatively limited stock of modules. For example, instead of the subassembly 2, a different subassembly could be used which implements a gripper or an actuator-driven pivot mechanism.

As will be discussed in more detail further below, the contact sections 5, 6, by means of which the subassemblies 2, 3 are connected to one another, are configured such that the subassembly 2 can be attached in several orientations to the subassembly 3, which orientations differ in terms of a rotation of the subassembly 2 about a rotation axis running in a transverse direction in FIG. 1. As will be discussed in more detail below with reference to FIGS. 2 to 4, four discrete orientations are possible here by way of example, which orientations differ by an angle of rotation of 90°. Thus, whilst the subassembly 2 in FIG. 1 is attached to the subassembly 3 such that a component 10 moved by actuator means, in the example a carriage, is arranged on the top side of the subassembly 2, it is also possible, by changing the orientation of the contact section 5 and thus of the subassembly 2 before the subassembly 2 is attached to the subassembly 3, for the moved component 10 to be arranged at the bottom side or to be arranged at that side of the subassembly 2 which faces toward the viewer, or that side of the subassembly 2 which faces away from the viewer, in FIG. 1.

The possibility of adapting the orientation of the subassembly 2 relative to the subassembly 3 thus makes it possible, with little outlay, for the module formed by the subassembly 2 to be used flexibly for a large number of applications in a large number of devices. In the example shown, a suitable position of the component 10, or a suitable movement path 12, is selected through suitable selection of the orientation. If, in a modification that is not shown, the movement path 12 were to run at an angle with respect to the connecting direction 7 in which the first contact section 5 is plugged or pressed onto the second contact section 6, a change of the orientation of the contact section 5 and thus of the subassembly 2 would also lead to a change of the movement direction. If, instead of a linear movement of the component 10, a rotation or pivoting of the component were to take place about a rotation or pivot axis running at an angle with respect to the movement direction 7, the direction thereof could likewise be determined through selection of said orientation.

The contact sections 5, 6 do not serve for the mechanical retention or support of the subassemblies 2, 3 on one another, or, in a modification that is not shown, the mechanical retention or support could also be implemented in some other way, for example by means of support sections, which are arranged spaced apart from the contact sections 5, 6, of the subassemblies 2, 3. Specifically, it is primarily the case that a connection interface 4 is formed as a result of the plugging or pressing of the contact section 5 onto the contact section 6. Said connection interface comprises firstly an electrical interface 8 for the transmission of electrical power and of communication signals, in the example via the network 17, for example via an ethernet connection, and secondly a fluid interface 9 for the transport of fluid between the first and the second subassembly 2, 3.

Through suitable design of the contact sections 5, 6, an example of which will be discussed further below, it can be achieved that, in a large number of possible orientations of the contact section 5 with respect to the contact section 6, the connection interface is automatically formed when the contact section 5 is plugged or pressed onto the contact section 6. Here, the various possible orientations differ from one another exclusively in terms of a rotation about the rotation axis running in a transverse direction in FIG. 1.

The movement of the component 10 is realized by means of the actuator 11 of the subassembly 2, which in the example is a pneumatic actuator. Alternatively, it would for example be possible for an electric drive to be used as an actuator. The operating fluid for the actuator 11, that is to say compressed air, is provided by a compressor 13 in the subassembly 3 and is fed to the actuator 11 via the fluid interface 9 and a further component 14 for controlling the fluid flow, for example a valve. The component 14 is in turn electrically controlled by a control unit 15, which is firstly supplied with power by means of an electrical current supply 18 in the subassembly 3 via the electrical interface 8 and is secondly controlled by a central control unit 16 in the first subassembly via the network 17, which is likewise led via the electrical interface 8.

Figure 2:
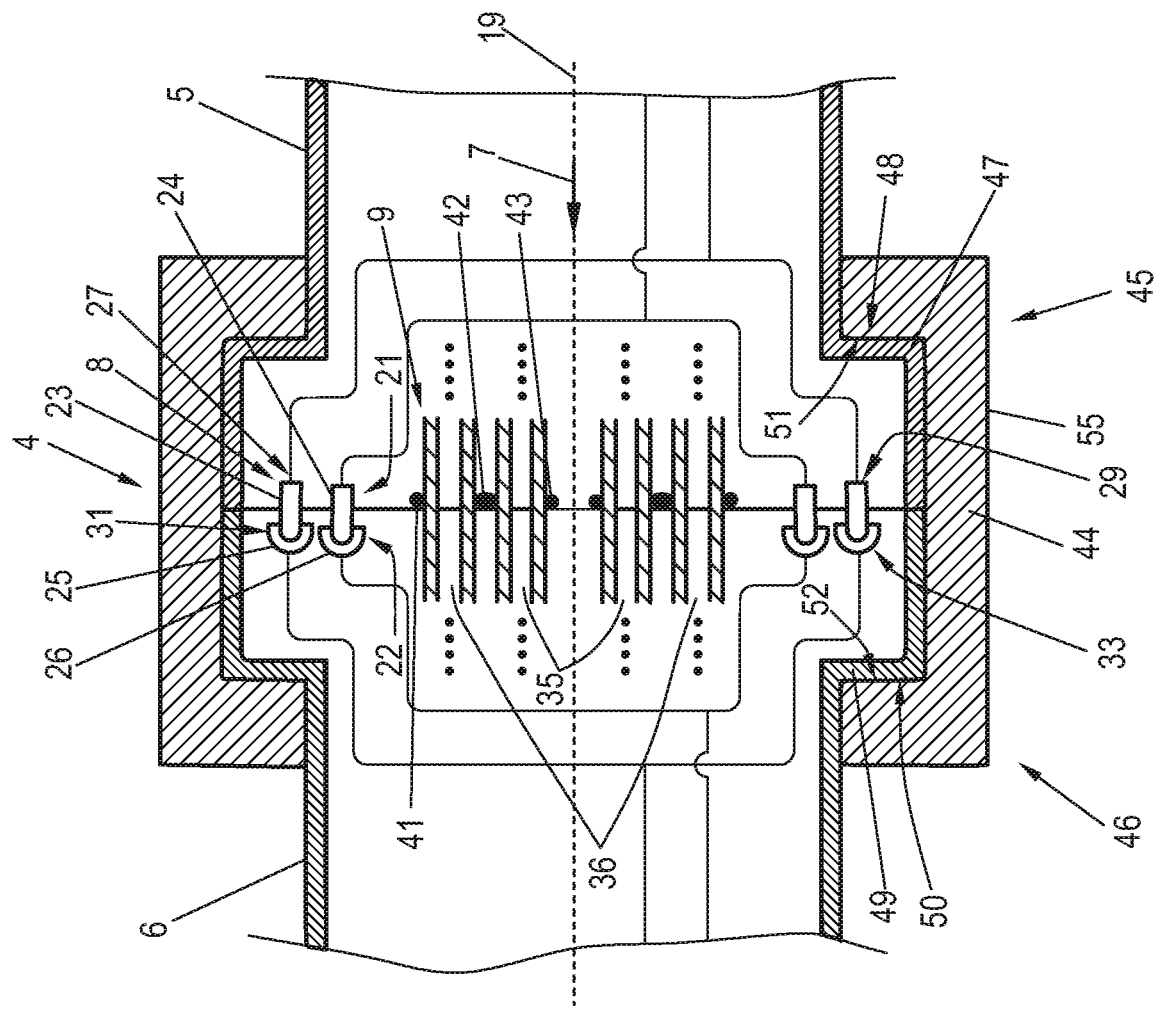
Figure 3:
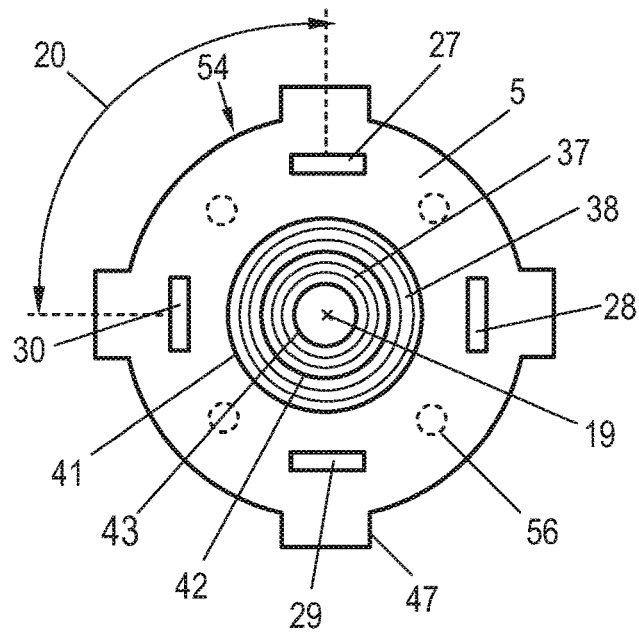
Figure 4:
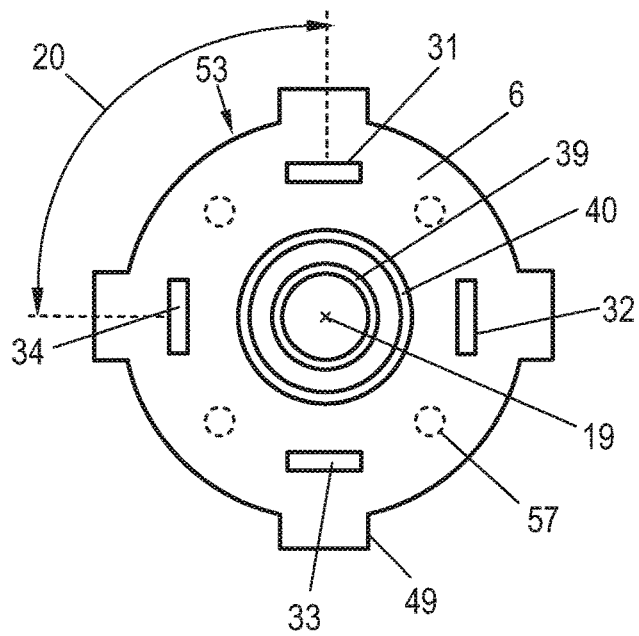

One possibility for the configuration of the contact sections 5, 6 that form the connection interface 4 will be discussed in more detail below with reference to FIGS. 2 to 4. Here, FIG. 2 schematically shows a section through the region in which the contact sections 5, 6 are pressed against one another or plugged into one another. FIGS. 3 and 4 schematically show plan views of the contact sections 5, 6. The surfaces facing toward the viewer in these two figures are moved toward one another in order to produce the connection interface 4. The respective side wall of the contact sections 3, 4 that faces toward the viewer in FIGS. 3 and 4 is not illustrated in FIG. 2 the sake of clarity.

When the contact sections 5, 6 are in the connected state, the elastic restoring elements 41, 42, 43 attached to the contact section 5, which are formed by sealing means, namely by O-rings in the specific example, are pressed onto that surface of the contact section 6 which is illustrated in FIG. 4. This firstly causes the fluid channels 35, 36 to be sealed off. At the same time, as will be discussed further below, the fastening means 55 illustrated in FIGS. 2 and 4 is thus held in a fastening position in frictionally engaging fashion.

As can be clearly seen in particular in FIG. 2, the electrical interface 8 is formed, on the first and the second contact section 5, 6, by a respective group 21, 22 of multiple electrical connections 23 to 26. Here, multiple instances 27 to 34 are provided for each of the connections 23 to 26, of which only in each case two instances 27, 29, 31 and 33, which are offset by 180°, are illustrated in FIG. 2. Here, all instances 27 to 34 of a respective one of the connections 23 to 26 are conductively connected to one another such that, to produce the electrical interface, it is ultimately not of importance which of the multiple instances 27 to 34 of the respective electrical connection 23 to 26 is used to establish conductive contact. In principle, it would be sufficient for multiple provision of the individual electrical connections, that is to say multiple instances, which are conductively connected to one another, to be implemented only on one of the two contact sections 5, 6 in order to allow different orientations. In the example shown, this configuration is however provided for both contact sections 5, 6.

In the example shown, in each case exactly one instance of each connection of the group is combined to form a respective socket and a respective plug, wherein, for the sake of clarity, only these sockets or these plugs which comprise in each case exactly one instance of each connection of the respective group are schematically illustrated in FIGS. 3 and 4 as instances of the electrical connections 27 to 34. Since these plugs and sockets and thus the instances 27 to 34 of the electrical connections 23 to 26 are in each case offset with respect to one another by a specified angle 20, in the example by 90°, in a circumferential direction of the rotation axis 19, the contact section 5 can be plugged or pressed in multiple orientations onto the contact section 6, which orientations differ by an integer multiple of the specified angle 20, wherein the same electrical interface is provided in all of these orientations.

In order to also make the fluid interface possible in said steps irrespective of the selected orientation, respective partial channels 37, 38, 39, 40 are used in the contact sections 5, 6, which partial channels surround the rotation axis 19 as concentric annular channels as seen in a cross section perpendicular to the rotation axis 19 or in the plan view as shown in FIGS. 3 and 4. If the contact sections 5, 6 are now plugged or pressed onto one another as illustrated in FIG. 2, then the partial channels 37, 39 together form the fluid channel 35, and the partial channels 38, 40 together form the fluid channel 36, wherein the fluid channels 35, 36 are sealed off by sealing rings that simultaneously serve as elastic restoring elements 41, 42, 43. This connection is independent of which of several orientations, which differ in terms of a rotation about the rotation axis 19, of the contact section 5 with respect to the contact section 6 is used.

The use of two fluid channels 35, 36 can be advantageous in order to allow both a feed of working fluid to the subassembly 2 and a discharge of working fluid. Even though the two fluid channels 35, 36 are annular in the example shown, such a fluid-tight connection of partial channels could also be achieved, irrespective of an orientation in terms of a rotation about the rotation axis 19, if use is made, for example, of a central circular fluid channel within which the rotation axis runs.

In order to firstly prevent an inadvertent detachment of the connection interface, and secondly in particular also allow mechanical retention and support of the subassembly 2 on the subassembly 3, the fastening sections 5, 6 may be fastened to one another by a fastening means 55, as illustrated in FIG. 2.

Figure 5:
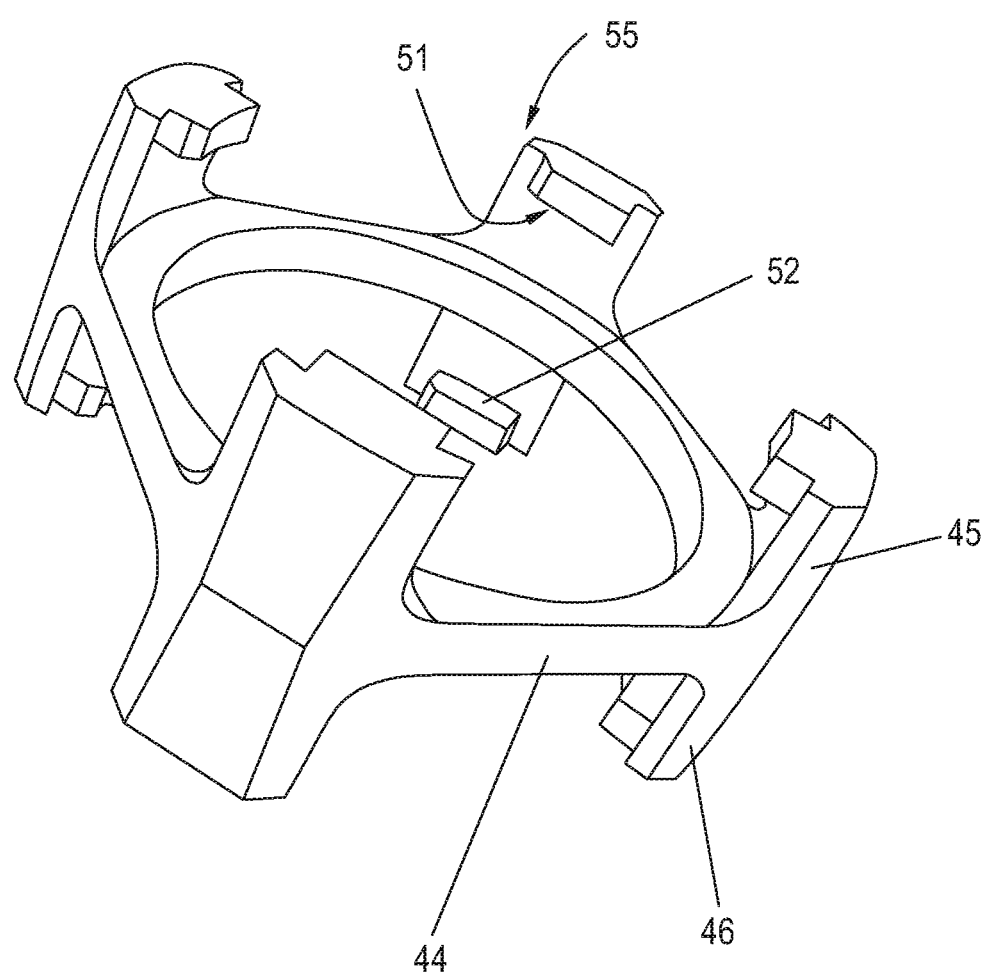

FIG. 5 shows a perspective view of one possible configuration of this fastening means 55. The fastening means 55 has a main body 44 which annularly encircles the rotation axis 19 and from which in each case multiple webs 45, 46, which are spaced apart from one another in a circumferential direction, project in the direction of the two contact sections 5, 6. Here, the webs 45 engage over in each case one support section 47 of the contact section 5 and engage on a support surface 48 of said support section 47, which support surface is averted from the other contact section 6. Correspondingly, the webs 46 engage over in each case one support section 49 of the contact section 6 and engage on a support surface 50 of said support section 49, which support surface is averted from the contact section 5.

This prevents the contact sections 5, 6 from being moved apart counter to the connecting direction 7 when the fastening means 55 is in the fastening position illustrated in FIG. 2, because the support surfaces 48, 50 abut against the web surfaces 51, 52. Since the contact sections 5, 6 and therefore also the support surfaces 48, 50 are pressed apart and thus against the web surfaces 51, 52 by the restoring elements 41, 42, 43, which as discussed are in this case sealing rings, the result is frictional engagement between the respective support surface 48, 50 and the respective web surface 51, 52.

The fastening means 55 may be provided as a separate subassembly, or else may be attached to one of the subassemblies 2, 3 or the contact sections 5, 6 and in particular rotatably mounted thereon. In a modification that is not shown, in the case of the fastening means 55 being attached to one of the contact sections, it is also possible for the webs that extend in the direction of said contact section to be omitted.

If the contact section 5 is attached to the contact section 6, the fastening means 55 is firstly moved into a release position, in which, as viewed perpendicularly with respect to the rotation axis 19 or with respect to the connecting direction 7, the web sections 51, 52 are situated in the intermediate spaces 53, 54 between the support sections 47, 49 of the contact sections 5, 6. These intermediate spaces are illustrated in FIGS. 3 and 4. The fastening means 55 is thus freely movable in the connecting direction 7 at least with respect to that contact section on which it is not mounted, in particular with respect to both contact sections. The contact sections 5, 6 can thus be pressed against one another or plugged onto one another without this operation being impeded by the fastening means 55.

The fastening means 55 can subsequently be rotated about the rotation axis 19 in order to pivot the respective web surfaces 51, 52 behind the respective support sections 47, 49, whereby the fastening position discussed above is attained.

In particular in order to compensate tolerances, it can be advantageous if it is possible to set the amount of possible play between the contact sections 5, 6 parallel to the rotation axis 19 or the intensity with which the restoring elements 41, 42, 43 should be preloaded. This can be achieved by virtue of the support surfaces 48, 50 and/or the web surfaces 51, 52 being bevelled in a circumferential direction, such that, in particular, these surfaces or at least one of these surfaces follow or follows a helical line. In this way, by setting the rotation angle of the fastening means 55, it is possible to set the degree to which the "screw" is tightened and thus the magnitude of clamping forces that act on the contact sections 5, 6, or the degree of play that remains for the contact sections 5, 6 in the connecting direction 7.

In order to firstly achieve good centering of the contact sections 5, 6 with respect to the rotation axis 19 and thus in particular a robust connection of the connection interface 4, and secondly prevent a relative movement of the contact sections 5, 6 perpendicular to the rotation axis and/or a relative rotation about the rotation axis 19, which can for example lead to an exertion of load on the plugs and sockets of the electrical interface, use may optionally be made of multiple projections 56 on the contact section 5 and mating recesses 57 in the contact section 6, which are illustrated by dashed lines in FIGS. 3 and 4. Here, the arrangement of the projections 56 and recesses 57 has the same rotational symmetry as the connection interface 4.

In a modification, it would also be possible for this rotational symmetry to be implemented only for the recesses 57, and for a smaller number of projections 56, for example only two or three of the projections 56 shown, to be used. In this case, depending on the orientation, some of the recesses would not be filled by projections.

While specific embodiments of the invention have been shown and described in detail to illustrate the inventive principles, it will be understood that the invention may be embodied otherwise without departing from such principles.

We claim:

1. A device, in particular for the handling and/or processing of parts, having a first and a second subassembly which are separably connected or connectable by means of a connection interface, wherein the connection interface results from a first contact section of the first subassembly being plugged and/or pressed in a connecting direction onto a second contact section of the second subassembly in a first orientation that is specified relative to the second contact section, wherein the connection interface comprises firstly an electrical interface for the transmission of electrical power and/or of communication signals between the first and the second subassembly and secondly a fluid interface for the transport of fluid between the first and the second subassembly, wherein the first and the second contact section are configured such that the connection interface also results if the first contact section is plugged or pressed in the connecting direction onto the second contact section in at least one further orientation, wherein the respective further orientation corresponds to the first orientation aside from a rotation of the first contact section by a respective specified angle about a rotation axis running in the connecting direction, wherein the first and second contact sections are connected to one another by a fastening means comprising a main body, which annularly encircles the rotation axis, and comprising in each case multiple first and second webs which project from the main body, wherein the first webs engage over in each case one support section of the first contact section and engage on a support surface of said support section, which support surface is averted from the second contact section, and the second webs engage over in each case one support section of the second contact section and engage on a support surface of said support section, which support surface is averted from the first contact section, in order to limit a movement of the contact sections apart in a connecting direction.

2. The device according to claim 1, wherein the electrical interface is formed on the first and second contact section in each case by a group of multiple electrical connections, wherein multiple instances are provided for each of the connections of the group on the first and/or second contact section, wherein the instances of a respective connection are conductively connected to one another and are arranged spaced apart from one another on a respective circular path about the rotation axis when the contact sections are in the connected state.

3. The device according to claim 1, wherein the fluid interface comprises at least one fluid channel that is formed by a fluid-tight connection of a respective first partial channel of the first contact section and a respective second partial channel of the second contact section, wherein, at least in the region of the fluid-tight connection, the fluid channel or at least one of the fluid channels annularly surrounds the rotation axis as viewed in a cross section perpendicular to the connecting direction, and/or wherein the rotation axis runs within the fluid channel or one of the fluid channels.

4. The device according to claim 3, wherein the fluid interface comprises several, in particular two, of the fluid channels, characterized in that, at least in the region of the fluid-tight connection, the fluid channels surround the rotation axis as coaxial rings as viewed perpendicular to the connecting direction.

5. The device according to claim 1, wherein the respective support sections of the first and/or of the second contact section are spaced apart from one another in a circumferential direction of the rotation axis, and/or in that the support surfaces of the support sections of the first and/or of the second contact section and/or those web surfaces of the first and/or second webs which make contact with the support surfaces are beveled in a circumferential direction.

6. The device according to claim 1, wherein the fastening means are configured such that a pressing force with which the contact sections are pressed against one another is variable by a way of a rotation of the annular main body about the rotation axis, and/or that, by way of said rotation, it is possible to set whether, and/or after how great a displacement travel counter to the connecting direction, a further movement of the contact sections apart is blocked by an abutment of the or a web surface of at least one of the webs against at least one of the support surfaces.

7. The device according to claim 1, wherein, between the contact sections, there is arranged an elastically deformable restoring element which subjects the first contact section to a restoring force in a direction away from the second contact section.

8. The device according to claim 1, wherein the first and/or the second contact section have multiple recesses into each of which, at least in the and/or the further orientation, a respective, in particular pin-like projection, which extends parallel to the rotation axis, of the respective other contact section engages.

9. The device according to claim 1, wherein at least one of the subassemblies comprises an actuator that is configured to move a component that is mounted so as to be movable with respect to the contact section of said subassembly, wherein a direction of the movement and/or of a rotation or pivot axis of the movement and/or a movement path of the component is dependent on whether the first contact section has been plugged and/or pressed in the or the further orientation onto the second contact section.

10. The device according to claim 9, wherein the actuator is a pneumatic or hydraulic actuator or at least one of the subassemblies comprises a pneumatic or hydraulic actuator, wherein the device is configured such that operating fluid used for the operation of the pneumatic or hydraulic actuator is conducted to said subassembly and/or discharged from said subassembly via the fluid connection.

11. The device according to claim 1, wherein at least one of the subassemblies comprises the or an actuator, wherein the device is configured such that control signals for the control of the actuator in the form of communication signals and/or power for the operation of the actuator, in particular for the operation of an electric drive used as an actuator, can be transmitted via the electrical interface to said subassembly.

12. The device according to claim 1, wherein a bus or network is led via the electrical interface.

13. A method for connecting a first subassembly to a second subassembly in a device, in particular in a device for the handling and/or processing of parts, wherein the first and second subassembly are connected by means of a connection interface by virtue of a first contact section of the first subassembly being plugged and/or pressed in a connecting direction onto a second contact section of the second subassembly in an orientation that is specified relative to the second contact section, wherein the connection interface comprises firstly an electrical interface for the transmission of electrical power and/or of communication signals between the first and the second subassembly and secondly a fluid interface for the transport of fluid between the first and the second subassembly, wherein a first and a second contact section are used which are configured such that, for multiple possible orientations of the first contact section with respect to the second contact section, which orientations differ from one another exclusively in terms of a rotation of the first contact section by a specified angle about a rotation axis running in the connecting direction, the connection interface results when the first contact section is plugged or pressed in the connecting direction onto the second contact section in the respective possible orientation, wherein one of the possible orientations is used as the specified orientation, wherein the contact sections are fastened to one another by a fastening means comprising a main body, which annularly encircles the rotation axis, and comprising in each case multiple first and second webs which project from the main body, wherein the fastening is performed by way of a rotation of the fastening means from a release position into a fastening position, wherein, in the fastening position, the first webs engage over in each case one support section of the first contact section and a respective web surface of the respective first web engages on a support surface of said support section, which support surface is averted from the second contact section, and the second webs engage over in each case one support section of the second contact section and a respective web surface of the respective second web engages on a support surface of said support section, which support surface is averted from the first contact section, wherein the respective support sections of the first and of the second contact section are spaced apart from one another in a circumferential direction of the rotation axis by intermediate spaces, wherein, in the release position, the web surfaces of the first and of the second webs are arranged in the intermediate spaces as viewed perpendicular to the rotation axis.

14. The method according to claim 13, wherein, as the first contact section is plugged or pressed in the connecting direction onto the second contact section, the respective web surface is guided through a respective one of the intermediate spaces.

15. A device, in particular for the handling and/or processing of parts, having a first and a second subassembly which are separably connected or connectable by means of a connection interface, wherein the connection interface results from a first contact section of the first subassembly being plugged and/or pressed in a connecting direction onto a second contact section of the second subassembly in a first orientation that is specified relative to the second contact section, wherein the connection interface comprises firstly an electrical interface for the transmission of electrical power and/or of communication signals between the first and the second subassembly and secondly a fluid interface for the transport of fluid between the first and the second subassembly, wherein the first and the second contact section are configured such that the connection interface also results if the first contact section is plugged or pressed in the connecting direction onto the second contact section in at least one further orientation, wherein the respective further orientation corresponds to the first orientation aside from a rotation of the first contact section by a respective specified angle about a rotation axis running in the connecting direction, wherein at least one of the subassemblies comprises an actuator that is configured to move a component that is mounted so as to be movable with respect to the contact section of said subassembly, wherein a direction of the movement and/or of a rotation or pivot axis of the movement and/or a movement path of the component is dependent on whether the first contact section has been plugged and/or pressed in the or the further orientation onto the second contact section, and wherein the actuator is a pneumatic or hydraulic actuator or at least one of the subassemblies comprises a pneumatic or hydraulic actuator, wherein the device is configured such that operating fluid used for the operation of the pneumatic or hydraulic actuator is conducted to said subassembly and/or discharged from said subassembly via the fluid connection.

* * * * *